United States Patent [19]

Izzo

[11] 3,974,474

[45] Aug. 10, 1976

[54] UNDERWATER ELECTROACOUSTIC TRANSDUCER CONSTRUCTION

[75] Inventor: Louis M. Izzo, Fayetteville, N.Y.

[73] Assignee: General Electric Company, Syracuse, N.Y.

[22] Filed: June 4, 1973

[21] Appl. No.: 366,454

[52] U.S. Cl. .................................... 340/10; 340/8 S

[51] Int. Cl.² ........................................ H04B 13/00

[58] Field of Search ........................ 340/8, 9, 10, 12

[56] References Cited

UNITED STATES PATENTS

| | | | |
|---|---|---|---|
| 2,101,893 | 12/1937 | Bokovoy et al. | 310/9.7 |
| 2,961,637 | 11/1960 | Camp | 340/9 X |
| 3,474,403 | 10/1969 | Massa et al. | 340/10 |
| 3,539,980 | 11/1970 | Massa, Jr. | 340/10 X |
| 3,716,827 | 2/1973 | Massa | 340/8 S |
| 3,718,898 | 2/1973 | Cook et al. | 340/10 |

*Primary Examiner*—Harold Tudor
*Attorney, Agent, or Firm*—Carl W. Baker; Joseph B. Forman; Frank L. Neuhauser

[57] ABSTRACT

The electroacoustic transducer disclosed is of double mass loaded piezoelectrically driven type particularly adapted to high power sonar array application. For reducing transducer sensitivity to interference and noise of frequencies at and below the transducer moving assembly mounting resonance, without significant impairment of transducer efficiency even at high power levels in the active mode operating frequency bands, the transducer moving assembly mounting resonance is damped by provision of a resistive coupling which in its preferred form comprises a lossy rubber ring compressed between the transducer housing and the inertia mass. Corona suppression means effective at high power levels of operation as described also are disclosed.

3 Claims, 3 Drawing Figures

UNDERWATER ELECTROACOUSTIC TRANSDUCER CONSTRUCTION

BACKGROUND OF THE INVENTION

The invention herein described was made in the course of or under a contract, or subcontract thereunder, with the Department of the Navy.

The present invention is directed to electroacoustic transducers useful for underwater applications generally and particularly suitable for high power array sonar applications. More specifically, the invention is directed to such transducers of the double mass loaded piezoelectrically driven type, and has as its primary objective the provision of such transducers affording improved performance capabilities in a number of important respects.

As commonly implemented, double mass loaded transducers of the kind referred to comprise two dissimilar mass elements, a head mass or radiation element which couples acoustically to the surrounding water, and a tail or inertia mass the weight of which usually is at least several times that of the head mass. The head and tail mass elements are fixed to opposite ends of the piezoelectric driver element, and the resultant mass and driver assembly is mounted within the transducer housing by compliance means permitting oscillatory motion of the mass elements either with differential motion between the two elements and corresponding longitudinal extension of the piezoelectric element (the transducer active mode), or as a unitary oscillatory mass vibrating at the basic resonance frequency of the assembly and mount (the mounting resonance mode). When driven by the piezoelectric element the same force levels are applied to the head and tail masses, and since their weights differ by some multiple the amplitudes of their respective motions will be different with the head mass displacement being of amplitude reflecting a corresponding multiple of tail mass displacement.

The tail mass motion accordingly is of relatively small amplitude, and the general design practice with transducers of this type has been to decouple the tail mass as completely as possible from the transducer housing and to permit freest possible longitudinal movement of the tail mass. To this end, the tail mass normally is suspended within the housing by compliance means affording only radial constraint of the tail mass and permitting its undamped longitudinal motion, and particularly in deep submersion applications this decoupling may be enhanced by provision of pressure release means such as a pad of Corprene or other release material interposed between the tail mass and housing.

The prior art also includes a number of proposals (see, e.g., U.S. Pat. Nos. 2,961,637; 3,230,503; 3,474,403; and 3,539,980) in which the tail mass mounting includes one or more annuli of elastomeric material inserted between the tail mass and transducer housing for purposes of controlling transverse or radial motions of the tail mass within the housing, but in these systems there is purposeful avoidance of any change in the suspension compliance with respect to tail mass longitudinal motion as a consequence of the introduction of the transverse motion control device.

In such conventional transducer configuration, tail mass motion may be well controlled and maintained in the desired phase relation with head mass motion at operating frequencies above the mounting resonance frequency of the transducer moving assembly, i.e., the resonance frequency determined by the total mass of the transducer movable element assembly and by the compliance of its suspension. Below this mounting resonance frequency, however, the transducer element motion is not similarly well controlled and tail mass motion may depart from the desired phase relation with head mass motion. Significant levels of acoustic energy input to sonar systems frequently are encountered in the sonar environment at such low frequencies, hence the unfavorable impact of such extraneous input on transducer performance is common and may be troublesome even though the frequencies involved are well below the active mode operating frequency bands of the transducer.

BRIEF DESCRIPTION OF THE INVENTION

The present invention has as its principal objective the provision of underwater acoustic transducer configurations in which this troublesome sensitivity of known transducers to interference and noise at such low frequencies is reduced or eliminated without significant impairment of transducer operating efficiency even at high power levels in active mode operating frequency bands. The invention also comprehends other improvements in transducer design directed toward this same end, such as improved corona suppression effective at the high voltages necessary for high power levels of transducer operation.

In accordance with the invention, transducer sensitivity to low frequency interference and noise may be reduced by provision of an additional compliance in the form of a thin lossy rubber ring which is compressed between the transducer tail mass and the enclosing housing. The mechanical impedance added by this ring provides essentially resistive damping of the transducer moving assembly through a shearing action which occurs within the thin rubber section of the ring, the inside and outside surfaces of which at least frictionally engage the opposed surfaces of the tail mass and housing and so are constrained to move therewith. The impedance thus provided accordingly functions effectively to constrain and damp the longitudinal motion of the transducer tail mass in response to acoustic energy at low frequencies, while not substantially affecting transducer operation at higher frequencies.

BRIEF DESCRIPTION OF THE DRAWINGS

The invention will be further understood and its various objects, features and advantages more fully appreciated by reference to the appended claims and to the following detailed description when read in conjunction with the accompanying drawings, wherein:

DETAILED DESCRIPTION OF THE INVENTION

Figure 1:
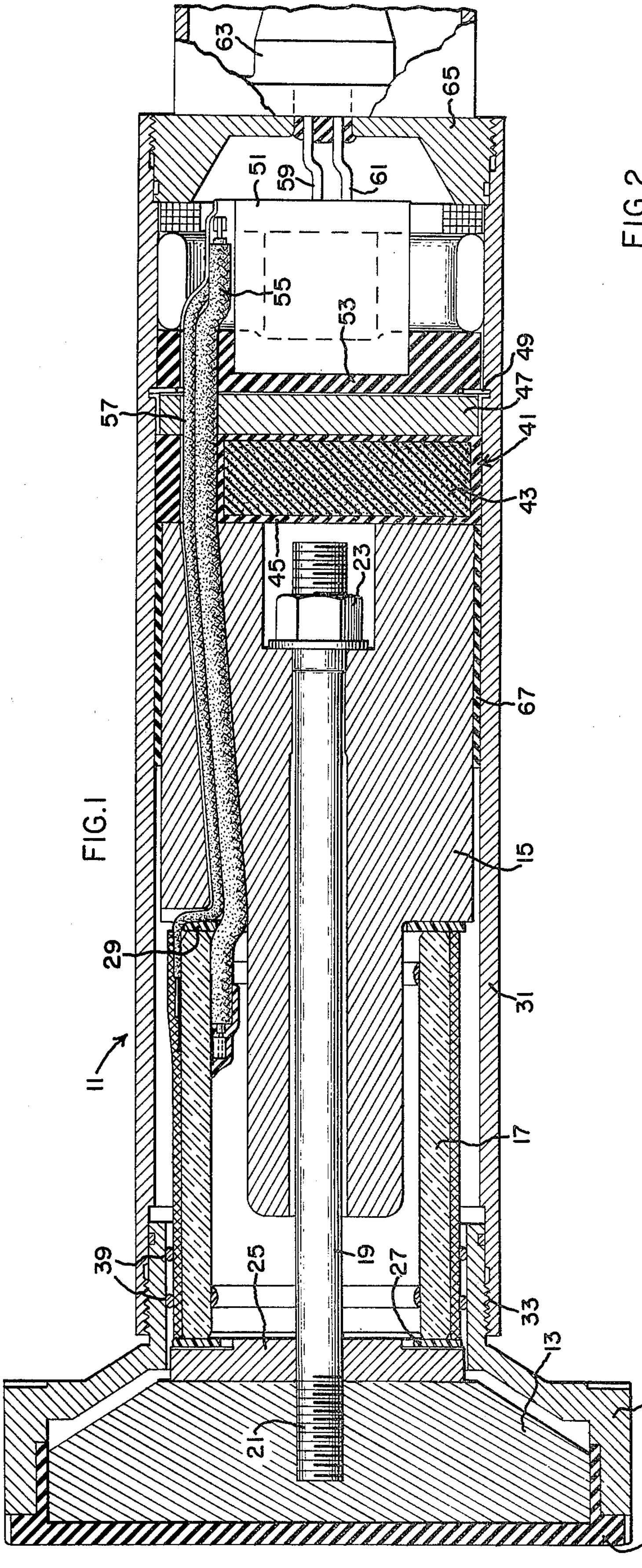
FIG. 1 is a part sectional view of a double mass loaded transducer in accordance with the invention.

With continued reference to the drawings, wherein like reference numerals have been used throughout to designate like elements, FIG. 1 illustrates a double mass loaded electroacoustic transducer shown as of piezoelectrically driven type. The invention in its broader aspects, however, has application also to magnetostrictively driven transducer elements as well.

In FIG. 1 the transducer designated generally by reference numeral 11 comprises two loading masses 13 and 15 commonly termed the head mass and tail or inertia mass, respectively. These masses are mounted to opposite ends of a piezoelectric driver element 17, which as shown takes the form of a ring or hollow cylinder of a polarized piezoelectric ceramic material such as lead zirconate titanate, which may be of conventional composition and fabricated into the form shown using conventional manufacturing techniques. The piezoelectric element 17, on which further detail will be set forth later, is disposed coaxially with the head and tail mass elements and is held in compression between them by a tension rod 19 one end of which has threaded engagement as at 21 with the head mass 13. A nut 23 on the other end of rod 19 is tightened to maintain the driver and mass elements in assembled relation, with the rod 19 normally supplying at least sufficient compression to the piezoelectric element 17 to assure that it remains compressively stressed even when driven at the highest desired power level in the transducer active mode.

In order to obtain the desired ratio of weights of the tail and head masses the head mass preferably is fabricated of aluminum or like low density metal, and to enhance its stiffness a large steel disc such as shown at 25 interposed between the head mass and piezoelectric element may be provided. The piezoelectric element 17 also is separated from the tail and head mass assemblies by insulating washers 27 and 29, respectively, which preferably may be of fiberglass or like material capable of providing both electrical insulation and physical separation between the ceramic of the piezoelectric element chamber 17 and the metallic bodies of the tail and head masses.

The double mass loaded driver assembly comprising the elements just described is enclosed within a two-part housing including a circular-section steel tube 31 having threaded engagement as at 33 to an enlarged tubular portion 35 of the housing within which is located the head mass 13. Preferably, the head mass and its surrounding housing are held in assembled relation by an end face member 37 of silicon or other low loss rubber which is molded in place and bonded both to the head mass 13 and to housing member 35. The face member thus provided for the transducer serves both to seal against entrance of water around the transducer head mass, and also to provide the necessary compliant mounting for the head mass end of the transducer moving assembly. It should be noted that the face seal thus provided also enables translatory movement of the transducer assembly to accommodate changes in ambient pressure due to operation at different submersion depths as would be the case particularly in submarine sonar applications. A pair of O-rings 39 may be provided near the outer end of the transducer assembly as shown, for limiting radial or transverse displacement of the piezoelectric element 17 in response to shock and the like.

At its other end, the transducer moving assembly bears against a pressure release element or compliance 41 which as shown comprises a pad 43 of spongy material encapsulated within a Neoprene or like rubber envelope 45. Preferably the release material is Sonite, a commercially available material understood to comprise glass beads and asbestos fibers dispersed in a binder, but other known release materials such as Corprene (cork and Neoprene) may alternatively be used. The pressure release or compliance element 41 serves to decouple the longitudinal motion of the transducer tail mass from the enclosing housing 31 in an essentially lossless manner, i.e., with the compliance introduced by the pressure release element made as high as possible. This provides essentially reactive loading of the tail mass for all longitudinal motion, including motion due to the longitudinal extensional vibration of the piezoelectric driver element when the transducer is operating in its active mode, and the longitudinal displacement of the transducer movable assembly when vibrating in its mounting resonance mode.

The pressure release element 41 is lightly compressed between the tail mass 15 and a housing wall member 47 which is fixed within the transducer housing 31 as by a locking ring 49 engaged in an annular groove in the tubular housing as shown. In the housing chamber formed to the right of this wall member, there may be provided the usual transformer or inductor 51 which provides transducer tuning and forms part of the transducer drive circuitry. This inductor 51 may be encapsulated within a potting material as at 53, and electrical connections as hereinafter described in greater detail are provided by leads 55 and 57 to the piezoelectric driver element and by leads 59 and 61 to the external power supply cable (not shown). These latter leads preferably are conducted through an insulating Neoprene fitting 63 which is molded in place through an aperture in the end cap 65 which closes this end of the transducer housing assembly.

Figure 2:
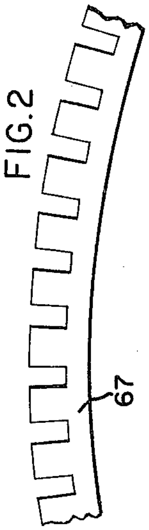
FIG. 2 is a fragmentary plan view of a damping ring element suitable for use in the transducer of FIG. 1.

Returning now to the transducer moving assembly suspension, a mechanical impedance is introduced between the transducer tail mass and the surrounding housing member 31 by a relatively thin rubber ring element 67, typically of the order of one-tenth inch in nominal or unconstrained thickness, which is compressed between the opposing surfaces of the tail mass and housing. This ring 67 is fabricated of a lossy elastomeric material such as a butyl rubber selected for its lossiness characteristic; butyl rubber to Government Specification MIL-R-3065C, MIL-STD-417, Type RS, Class 515, has been found suitable. This ring element 67, the preferred form of which is shown in greater detail in FIG. 2, may be fabricated initially as a continuous ring which is slipped over the tail mass or may be in the form of an initially rectangular band of material which is wrapped around the tail mass to thus form a broken ring. In either case, the ring element preferably is bonded to the tail mass as by any suitable conventional rubber cement, and in cross section is of the configuration shown in FIG. 2.

As there illustrated, the outwardly facing surface of the ring element 67 is toothed or serrated, with the slots between teeth being approximately half the tooth width, and with slot depth being approximately equal to tooth width. This toothed configuration has been found advantageous in several significant respects; first, it is helpful during assembly of the transducer moving mass assembly into the housing, during which step it facilitates the relative rotation of the housing with respect to the tail mass which is necessary to accomplish the threaded interconnection of the two housing members shown at 33. To further facilitate this assembly operation, a light coating of a suitable lubricant may be applied to the inner surface of the housing 31 without adversely affecting the damping characteristic of the ring 67 as hereinafter explained.

Even with such use of lubricant during assembly of the transducer tail mass into the housing, the butyl rubber ring 67 is sufficiently tightly compressed between the opposing surfaces of these members that its only sliding movements with respect thereto is that which results from bodily shift of the entire transducer movable assembly with change in ambient pressure due to change in submerged depth of the vehicle carrying the transducer. At any given operating depth, the relative movements betwen the transducer tail mass and housing in both active and resonance vibrational modes are accommodated by shearing action within the thin section of the rubber ring, thus introducing the desired damping. The affect of this damping is most pronounced at relatively low frequencies, at and below the system resonance frequency of the transducer moving assembly as a whole, and transducer operation at the higher frequencies of the transducer active mode operating frequency bands is not significantly affected.

In the particular transducer embodiment illustrated by way of example, the mounting resonance of a movable assembly configured as shown and suspended by the three compliances which have been described would be in the neighborhood of several hundred hertz, the precise value of resonance frequency being variable as a function of ambient pressure as determined by submersion depth. To maintain reasonable linearity of transducer sensitivity in the passive mode down to below this mounting resonance frequency, with reduced sensitivity to interference and noise energy at very low frequencies, the dimensions of the tail mass and housing and the unconstrained thickness of the lossy rubber ring 67 preferably are such that the ring is compressed to about 75% of its nominal 1/10 inch thickness upon assembly into the housing. The damping characteristic achieved then is such that above the mounting resonance frequency the transducer sensitivity and other operating characteristics are little affected by the added damping, while system sensitivity anomalies over the lower frequency band are well suppressed.

As previously indicated, the piezoelectric driver element 17 preferably is formed as a single hollow cylinder of polarized piezoelectric ceramic and operates in the longitudinal extensional mode. To drive this element, it is provided with metallic film electrodes 71 and 73 on its inner and outer surfaces, respectively, to which the high voltage lead 55 and ground lead 57 respectively connect. These electrodes may be applied in any conventional maner, as by application of one of the conventional silver-glass frits which is sprayed onto the ceramic surfaces in a suitable volatile binder and subsequently fired to yield continuous metallic silver electrodes, one on each of the inner and outer surfaces of the ceramic element as shown.

Even with exercise of extreme care and precision in performing the electroding steps just summarized, it has been found that at very high operating voltages corona problems may still be encountered. Such problems are believed due in part to the unavoidable small irregularities in the electrode edge contour, which tend to cause high voltage gradients at those irregularities, and due in part to the unavoidable presence of some number of isolated specks or islands of metallic silver located immediately adjacent to but not electrically connected with the main electrode body, which islands cause an effect sometimes called "capacitive" corona.

Figure 3:
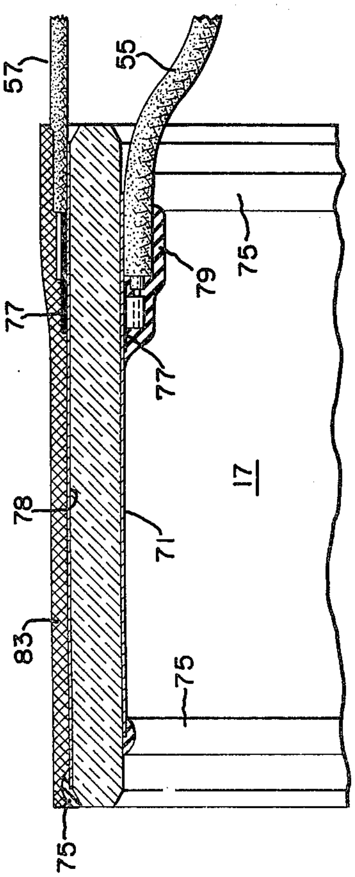
FIG. 3 is an enlarged showing of the piezoelectric drive element of the transducer of FIG. 1, illustrating improved corona suppression means.

To avoid these corona problems, there is applied to the circumferential edges of both the inner and outer electrodes a continuous relatively narrow bead 75 of a silver filled epoxy material which is electrically conductive but preferably only poorly so. This material, which preferably comprises about two parts by weight of metallic silver powder to one part by weight of a suitable commercial epoxy material such as that sold by the Hysol Corporation under its trade designation PC17, is applied by any conventional extrusion or striping device and the assembly then is baked at a temperature and for a time appropriate for cure of the particular epoxy used. The resultant poorly conductive bead thus formed along each of the transducer electrode edges, which is shown exaggerated in thickness in FIG. 3, has been found very effective in suppressing corona by substantially reducing the local electric field gradients along the electrode edges.

The connections of leads 55 and 57 to the electrodes 71 and 73, respectively, preferably are accomplished by soldering the lead wire ends to small squares of metallic screening as at 77 and the soldering the screens directly to the electrode surfaces using conventional techniques. The high voltage connection of lead 55 to electrode 77 may desirably be covered with epoxy as at 79, and the lead is enclosed within a heat shrinkable tubing as shown which provides further assurance against corona formation along the lead. The inner electrode 71 may be painted overall with a protective coating of epoxy, and the outer electrode is provided with a fiberglass-epoxy wrap designated by reference numeral 83.

This wrap comprises a continuous epoxy-wetted fiberglass filament which is wound, while maintained under tension, around the cylindrical piezoelectric element to a thickness preferably of at least several layers of the fiberglass. The assembly then is baked to cure the epoxy, with the fiberglass remaining under sufficient tension in the finished piezoelectric driver element to assure that in all its normal operating modes the radial stresses within the piezoelectric element always remain compressive and the piezoelectric material itself is not subjected to stresses in tension.

From the foregoing it is believed apparent that the transducer construction of this invention affords substantial improvement particularly in performance at very low frequencies, and also in corona prevention. As will be obvious, there are many possible modifications to the exemplary embodiment which has been described, as for example the piezoelectric driver element could be made in the form of an aligned series of relatively narrow rings rather than in the form of one continuous cylinder as shown. This and other modifications will be obvious to those skilled in the art and accordingly it should be understood that the appended claims are intended to cover all such modifications as fall within the true spirit and scope of the invention.

What is claimed as new and desired to be secured by Letters Patent of the United States is:

1. An electroacoustic transducer with damped response to very low frequency acoustic energy, comprising:

a. a piezoelectric driver element of hollow cylindrical form;

b. a head mass disposed in operative engagement with one end of said piezoelectric driver element;

c. a tail mass of cylindrical form and of inertia relatively high as compared to said head mass, disposed in operative engagement with the end of said piezoelectric driver element opposite said head mass;

d. means securing said piezoelectric driver element and said head and tail masses together with the piezoelectric element between the head and tail masses and forming a movable assembly therewith;

e. a tubular metallic housing enclosing said movable assembly;

f. compliance means mounting said movable assembly concentrically within said housing means for substantially undamped longitudinal motion therein and defining a basic resonance frequency for such motion of said assembly; and g. damping means including a thin ring of lossy rubber compressed between the opposed outer cylindrical surface of said tail mass and inner tubular surface of said housing and providing at least frictional engagement with both said surfaces for resistively damping longitudinal movement of said tail mass by shearing action within the lossy rubber.

2. An electroacoustic transducer as defined in claim 4 wherein said piezoelectric driver element includes at least one metallic film electrode to which high voltage is applied for driving the transducer at its operating frequencies, and wherein an edge of said electrode is covered by a bead of poorly conductive material for corona suppression.

3. A transducer as defined in claim 1 wherein said lossy rubber ring is adhered to one of said opposed tail mass and housing surfaces and has a toothed surface in frictional engagement with the other.

* * * * *